(12) United States Patent
Lautscham et al.

(10) Patent No.: US 12,332,266 B2
(45) Date of Patent: Jun. 17, 2025

(54) METHOD FOR DETECTING A PARTICLE IN A CONTAINER FILLED WITH LIQUID

(71) Applicant: cytena GmbH, Freiburg (DE)

(72) Inventors: Lena Lautscham, Freiburg (DE); Riko Moroni, Freiburg (DE); Clara Siber, Freiburg (DE); Julian Riba, Freiburg (DE)

(73) Assignee: cytena GmbH, Freiburg (DE)

( * ) Notice: Subject to any disclaimer, the term of this patent is extended or adjusted under 35 U.S.C. 154(b) by 300 days.

(21) Appl. No.: 17/868,474

(22) Filed: Jul. 19, 2022

(65) Prior Publication Data

US 2023/0028492 A1    Jan. 26, 2023

(30) Foreign Application Priority Data

Jul. 20, 2021   (LU) ........................................ 500454

(51) Int. Cl.
*G01N 35/10* (2006.01)
*B01L 3/02* (2006.01)
*G01N 35/04* (2006.01)

(52) U.S. Cl.
CPC ........ *G01N 35/1016* (2013.01); *B01L 3/0268* (2013.01); *B01L 2200/0647* (2013.01); *G01N 2035/0401* (2013.01); *G01N 2035/1025* (2013.01); *G01N 2035/1058* (2013.01)

(58) Field of Classification Search
CPC ....... G01N 35/1016; G01N 2035/0401; G01N 2035/1025; G01N 2035/1058; G01N 15/1433; G01N 15/1434; G01N 2015/1006; G01N 2015/1445; G01N 2015/1486; G01N 15/1429; B01L 3/0268; B01L 2200/0647; G06V 20/693
See application file for complete search history.

(56) References Cited

U.S. PATENT DOCUMENTS

| 4,932,044 A * | 6/1990 | Williams ............... G06T 7/0012 |
| | | 359/392 |
| 2017/0363534 A1* | 12/2017 | Schoendube ............ C12M 1/36 |
| 2020/0057880 A1* | 2/2020 | Mizutani ................ G06V 10/56 |

FOREIGN PATENT DOCUMENTS

WO    WO-2021261158 A1 * 12/2021 ............... G02B 7/36

\* cited by examiner

*Primary Examiner* — Kristina M Deherrera
*Assistant Examiner* — Fatemeh Esfandiari Nia
(74) *Attorney, Agent, or Firm* — Hodgson Russ LLP

(57) ABSTRACT

The invention relates to a method for detecting a particle in a container filled with liquid, the method having the following steps:
 dispensing a liquid sample into the container,
 scanning a partial volume area of the container in order to detect a particle located in the liquid sample, characterized in that
 an upper limit and a lower limit of the partial volume area is determined in a calibration operation upstream of the dispensing process.

14 Claims, 5 Drawing Sheets

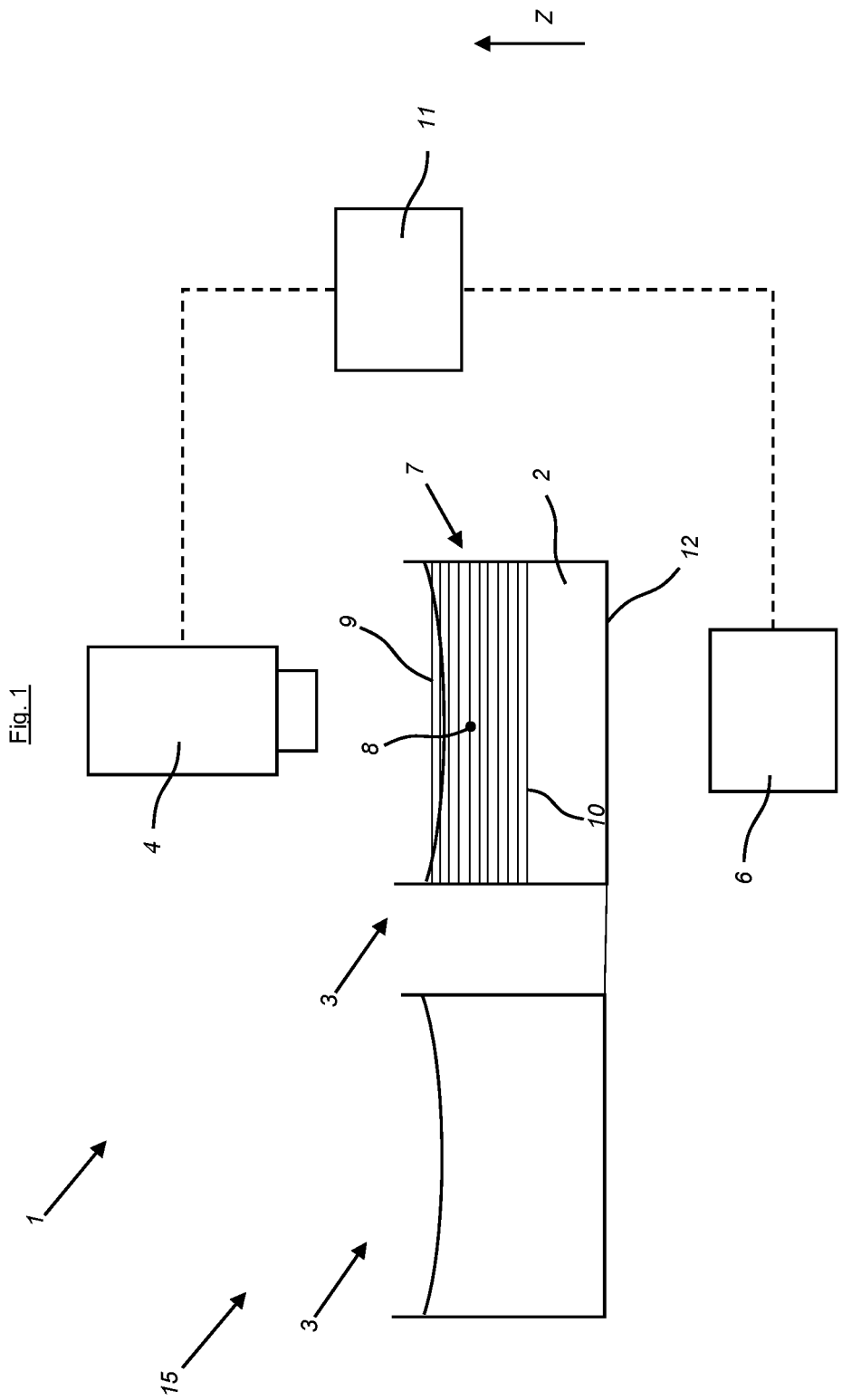

Figure 2E:
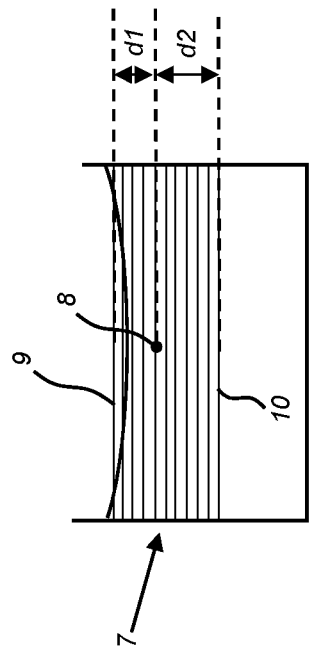

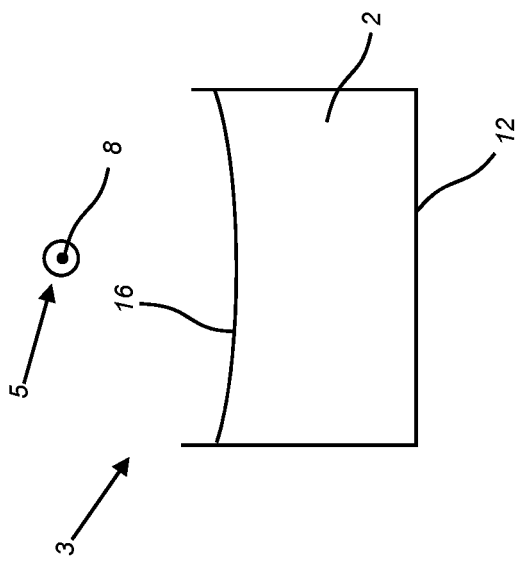
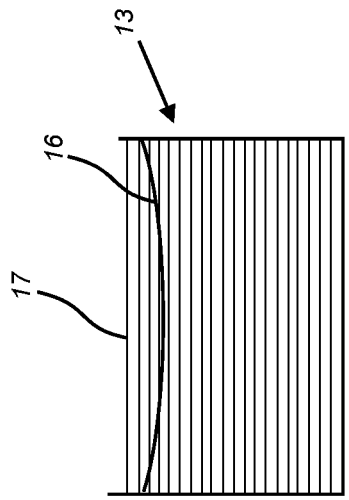
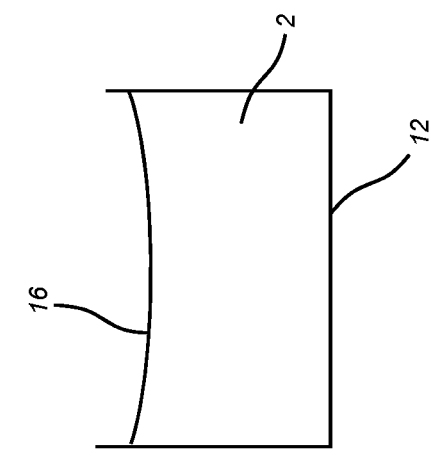

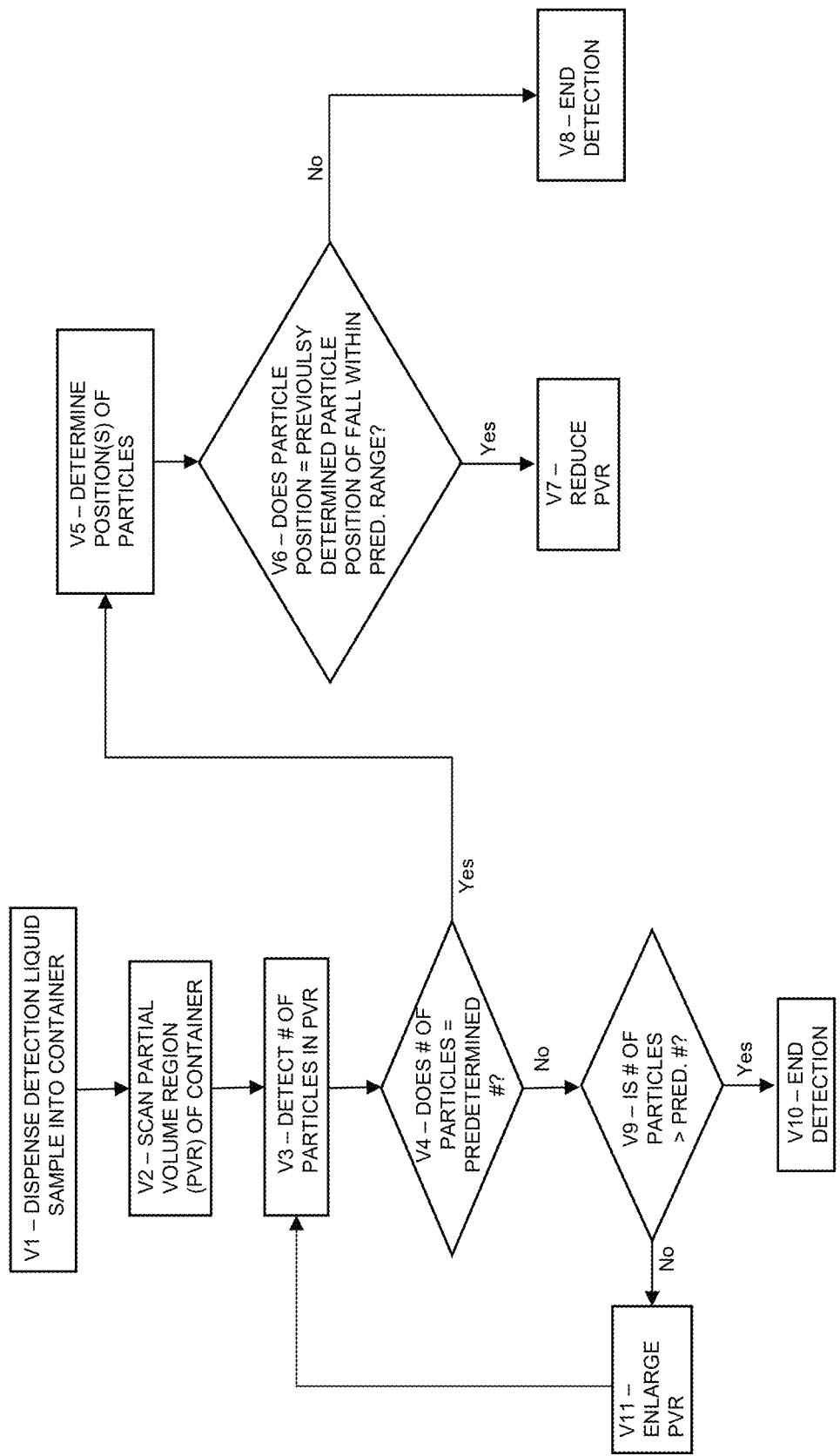

METHOD FOR DETECTING A PARTICLE IN A CONTAINER FILLED WITH LIQUID

CROSS-REFERENCE TO RELATED APPLICATIONS

The present application claims priority under 35 USC § 119 (b) of Luxembourg Patent Application No. 500454 filed Jul. 20, 2021, the entire disclosure of which is incorporated herein by reference.

FIELD

The disclosure relates to a method for detecting a particle in a container filled with liquid. In addition, the disclosure relates to a dispensing device. The disclosure also relates to a computer program, a data carrier and a data carrier signal.

BACKGROUND

It is known from the prior art that active substances, such as monoclonal antibodies and other proteins, are produced with the aid of so-called monoclonal cell lines. These are populations of cells that are all descended from a single parent cell. The production of monoclonal cell lines is necessary because this is the only way to ensure that all cells of the population have approximately the same genome to produce the active ingredients.

In order to produce a monoclonal cell line, cells are transferred individually into the containers of a microtiter plate. The transferred cells are produced by genetically modifying a host cell line and isolating these modified cells. Individual cells are deposited in the microtiter plates using, for example, free-jet printing methods or pipetting.

Thereafter, cell colonies that grow from a cell are cultivated statically in the containers of the microtiter plate, that is to say without movement, until they cover almost the entire bottom of the containers of the microtiter plate. The cell cultures are then gradually transferred to larger vessels. In particular, the cell cultures are transferred to microtiter plates of different sizes and then to a shaking flask and finally to the bioreactor. Typically, the shaking flask switches from static culture to dynamic culture, which means that the shaking flasks are continuously vibrated in order to mix the cell culture. Finally, from a series of many hundreds to thousands of such cell cultures, the one that can produce the largest quantity and most stable of active ingredients in a bioreactor is transferred to production.

For biological and regulatory reasons, it must be proven that the cell lines are clonal, i.e., derived from a mother cell. Designs are known from the prior art in which it is checked whether a cell is arranged on a container bottom. With the known methods, it is therefore necessary to wait until the cell sediments to the bottom. Since sample carriers with a large number of containers are used in the laboratory, it takes a very long time before it is checked for each container of the sample carrier whether a cell has been dispensed into the respective container.

SUMMARY

The object of the disclosure is therefore to provide a method that can be used to quickly check whether a particle has been dispensed into a container.

The object is achieved by a method for detecting a particle in a liquid-filled container, the method having the following steps:

dispensing a liquid sample into the container,
scanning a partial volume region of the container in order to detect a particle located in the liquid sample, characterized in that an upper limit and a lower limit of the partial volume region is determined in
a calibration operation upstream of the dispensing process.

Another object of the disclosure is to provide a dispensing device that can be used to quickly check whether a particle has been dispensed into a container.

The object is achieved by a dispensing device having a dispenser for dispensing a liquid sample into a container filled with liquid, a detection device for scanning a partial volume region of the container in order to detect a particle in the liquid sample, characterized in that the detection device has an upper limit and a lower limit of the partial volume region determined in a calibration operation upstream of the dispensing process.

According to the disclosure, it was recognized that it is advantageous if the partial volume region of the container to be scanned in a dispensing operation is determined in advance, i.e., before the dispensing operation, in a calibration operation. This offers the advantage that in the dispensing operation, during a dispensing process into the container, it can be determined quickly whether a particle has been dispensed into the container. Fast determination is possible because only the partial volume region has to be scanned in dispensing operation. As explained in more detail below, the partial volume region of the container comprises the liquid volume in which a particle dispensed into the container is located. Thus, to determine the presence of the particle in the container, it is not necessary to scan the entire liquid volume, which is time-consuming and memory-consuming. In addition, there is no need to wait for the particle to settle to the bottom, which enables a quick check to be made as to whether a particle has been introduced into the container.

A further advantage of the disclosure is that a partial volume region of the container, which at least partially comprises the liquid, is scanned. As is described in more detail below, the partial volume region of the container can also have a region in which there is no liquid. This is advantageous because it is no longer necessary to determine a liquid surface. Due to pipetting errors and/or meniscus effects and/or the special shape of the container, determining the liquid surface is often only possible imprecisely and is time-consuming. As a result, the determination of the presence of the particle in the liquid volume can be done quickly. In addition, the partial volume region can be determined automatically.

The liquid sample can have liquid and biological particles. The biological particles can be microorganisms, such as bacteria, archaea, yeast, fungi, and viruses, or cells, DNA, RNA, or proteins. The liquid sample can have one or more of the aforementioned biological particles. The liquid can be a cell suspension that can promote growth of the cells arranged in the liquid. Alternatively, the particle can be a glass or polymer bead and have essentially the same volume as a cell. The liquid of the liquid sample can be the same liquid that is placed in the container.

The liquid sample dispensed by means of the device can be an, in particular free-flying, droplet. The liquid droplet can have a volume ranging from 1 pl (picoliter) to 1 μL (microliter). In this case, the dispensing of the sample can be performed according to a drop-on-demand mode of operation. In this case, the dispensing device provides a discrete and not a continuous dispensing of the sample. To implement the drop-on-demand mode of operation, the dispensing device can have an actuating means, which can, for example, be a piezoelectrically operated actuator. The device can have a section, particularly a mechanical diaphragm, that is actuatable by the actuating means. When the actuating means is actuated, the liquid sample, in particular a droplet, is ejected from the dispenser.

The liquid sample dispensed from the dispensing device can have liquid and no particle. Alternatively, the dispensed liquid sample can have liquid and a single particle. In addition, the dispensed liquid sample can have liquid and more than a single particle.

Scanning is a process in which a large number of images are recorded. The images cover a partial volume region. The individual image planes are offset from one another. In particular, the image planes are offset from one another in a spatial direction, in particular a spatial direction perpendicular to a container bottom. The image planes are placed in such a way that they are close enough to each other so that all particles can be recorded.

The partial volume region covers only part of the container. In this case, the partial volume region is arranged offset from a container bottom. The partial volume region can be arranged offset to the container bottom in a spatial direction, in particular a spatial direction perpendicular to the container bottom. The partial volume region can comprise the entire container in a container cross-sectional plane that is perpendicular to the aforementioned spatial direction. Alternatively, the partial volume region in the cross-sectional plane of the container can comprise only part of the container. This offers the advantage that the computing effort for determining the particle is low.

The delimitation of the partial volume region in one spatial direction is understood as the upper and lower limit. Thus, the upper limit is arranged offset from the lower limit along a spatial direction, in particular a spatial direction perpendicular to the bottom of the container. In this case, an upper plane containing the upper limit runs parallel to a lower plane containing the lower limit. The upper and lower levels can run parallel to a container bottom. The lower level is arranged closer to the bottom of the container than the upper level.

The detection device may have an imaging device, such as a camera, to capture images. In addition, the detection device can have an evaluation device, by means of which the recorded images are evaluated. In this way, the evaluation device can determine the number of particles located in the partial volume region. The evaluation device can be a processor or have a processor.

In a special embodiment, a liquid surface and/or a cross-sectional area of the container can be determined in the calibration operation, in particular by the detection device. The cross-sectional area can be entered by a user of the dispensing device and/or is stored in the dispensing device. Thus, the cross-sectional area of the containers is known for a large number of sample carriers. Likewise, the amount of liquid entered into the container can be entered by a user of the dispensing device. The liquid surface can be determined by an algorithm, in particular one that is executed in the evaluation device.

In addition, the bottom of the container can be determined in the calibration operation. The bottom of the container can be determined by an autofocus method of the detection device. Alternatively or additionally, the bottom of the container can be determined by a scanning process, described in more detail below, in which a large number of images are recorded. By knowing the bottom of the container, the liquid surface can be easily determined.

The dispensing device can have a control device. The control device can cause a container volume to be scanned. The container volume comprises a volume from a container bottom to the liquid surface. Alternatively, the container volume can have a volume from a container bottom to an upper limit, which is arranged offset by a predetermined safety distance from the liquid surface. This offers the advantage that the liquid surface does not have to be determined precisely. In addition, a volume can be scanned that is below a container bottom. This offers the advantage that a container bottom does not have to be determined. The evaluation device can determine the bottom of the container by evaluating these images and the images of the container volume.

The control device can cause the container volume to be scanned in the calibration operation before the liquid sample is dispensed. Thus, multiple background images of the container volume are captured. These background images can be used in subsequent detection of a particle in the partial volume region.

In addition, the control device can cause a liquid sample, which has a particle, to be dispensed during the calibration operation. The particle can be dispensed after the background images are captured. The particle can be a biological particle analogous to the particle dispensed in the dispensing operation.

In the calibration operation, a liquid sample can be dispensed into at least one container of a sample carrier that has a number of containers. In the calibration operation, the particle is dispensed into a different container than a particle in dispensing mode. Dispensing operation is understood to mean operation of the dispensing device in which one or more dispensing processes are carried out, with the detection device scanning the partial volume region determined in the calibration operation or, as explained in more detail below, an adapted partial volume region in each of the dispensing processes. The control device can cause the calibration method to be carried out when a sample carrier with multiple containers is inserted into the dispensing device.

As described above, it is common for liquid samples to be dispensed into a large number of containers of a sample carrier. The time-consuming calibration operation is carried out during at least one dispensing process in order to determine the partial volume region. This partial volume region is then used for the other dispensing processes in at least some of the containers. In all cases, the control device can cause the liquid sample to be dispensed and/or a scanning process to be carried out by the detection device.

In particular, in the calibration operation, the control device can cause the detection device to scan the container volume. A large number of images of the container volume are generated in the process. These images also contain the dispensed particle. The detection device can detect the particle using the captured images and the captured background images. For this purpose, the recorded background images and images can be compared with one another. As a result, it is easily determined whether or not a particle is arranged in the partial volume region.

In a special embodiment, the detection device can detect a position of the particle, in particular a height of the particle, in the calibration operation. The height is the distance of the particle from a container bottom along a spatial direction perpendicular to the container bottom. The detector may determine the upper limit and the lower limit based on the detected position of the particle. Thus, the upper limit can be arranged offset by a predetermined first distance and the lower limit can be arranged offset by a predetermined second distance from the position of the particle. The upper limit is arranged offset to the particle along a spatial direction, in particular a spatial direction which is perpendicular to the bottom of the container. The lower limit is arranged offset to the particle in the opposite direction to the upper limit along the spatial direction.

The second distance can be greater than the first distance. Alternatively, the first and second distances can have the same value. The values for the first distance and the second distance can be specified by a user of the dispensing device. The determined partial volume region can be used in at least some of the dispensing processes that follow the calibration method. As a result, it is possible to automatically determine the relevant partial volume region in which the particle is located after it has been dispensed into the container.

As described above, the control device causes the dispenser to dispense a liquid sample and the detector to perform a scanning operation in the calibration operation and/or in the dispensing operation. The control device can cause the detection device to start the scanning process at the same time as the dispensing process. Alternatively, the process may wait for a certain period of time before the scanning process is started. This period of time then takes into account the fact that the dispensed liquid sample needs a certain amount of time before it hits the liquid in the container.

In a dispensing operation, the control device can cause the position of the particle to be determined after a predetermined number of dispensing processes. Alternatively, the position of the particle can be determined for each dispensing process. The detection device can determine the position of the particle in the respective container in the case of several dispensing processes in several containers. The control device can cause the partial volume region to be adjusted, in particular reduced, if the particles in the respective containers have the same position or a position in a predetermined volume. The predetermined volume is smaller than the sub-volume region. This offers the advantage that the determination of whether the particle is arranged in the container can be carried out quickly because the number of images to be recorded and evaluated depends on the size of the partial volume region.

In a special embodiment, the detection device can check whether the particle is located in the partial volume region. This check can be carried out with every dispensing process. The controller may cause the partial volume region to be scanned to increase when the particle is outside the partial volume region. In particular, in such cases, the receptacle area can be scanned to determine whether the particle has been dispensed into the receptacle. This avoids a particle dispensed into the container not being detected.

In addition, the controller may cause a calibration operation to be re-initiated when the particle is outside of the partial volume region. As an alternative or in addition, the control device can cause the calibration operation to be initiated again after a specified number of dispensing processes. In all cases, the partial volume region is determined again, which is used in the subsequent dispensing processes in the dispensing operation.

The detection device can determine the number of particles in the partial volume region. In the event that the detection device determines a predetermined number of particles, in particular a single particle, in the partial volume region, the detection process can be completed and a new dispensing process into a new container can take place. In the event that no particle is arranged in the partial volume region, the partial volume region can, as already described above, be expanded and/or a new calibration operation can be initiated. If the number of particles in the partial volume region is greater than the specified number of particles, the detection process is terminated and a new dispensing process into a new container takes place. However, it is stored in a memory that the container should not be used for further analysis and/or examination processes.

Of particular advantage is a device comprising means by which a method according to the disclosure can be carried out. In addition, a computer program comprising instructions which, when the program is executed by a computer, cause the computer to carry out the method according to the disclosure is of particular advantage. A data carrier on which the computer program according to the disclosure is stored is also advantageous. In addition, a data carrier signal that transmits a computer program according to the disclosure is advantageous.

BRIEF DESCRIPTION OF THE DRAWING VIEWS

Figure 2D:
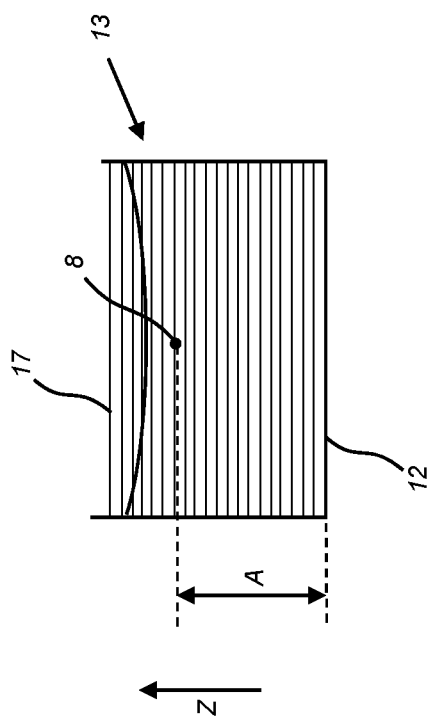
Figure 3:
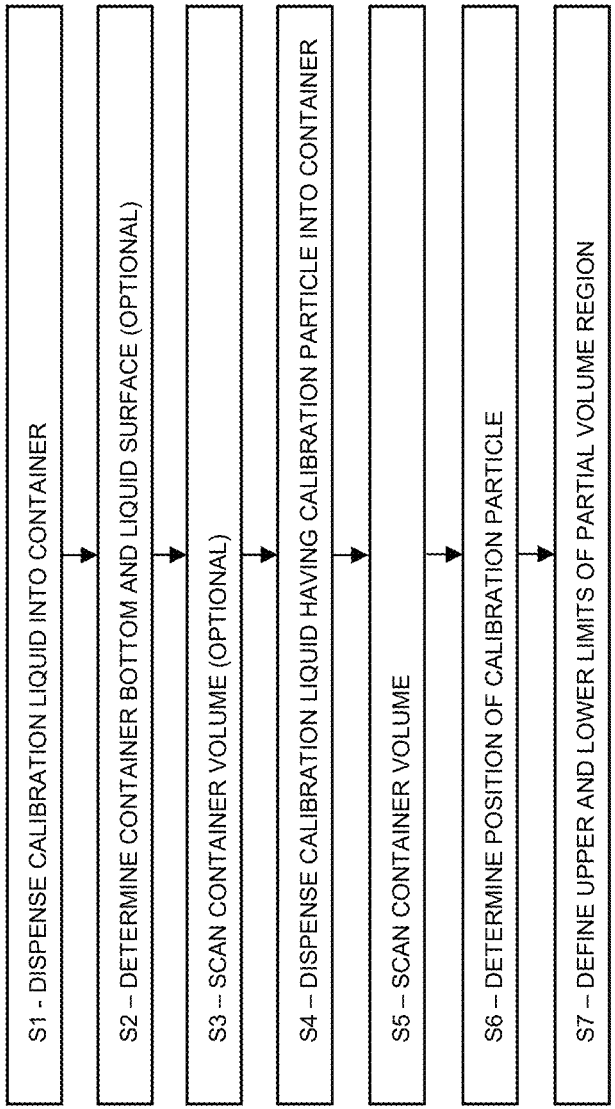

The subject matter of the disclosure is shown schematically in the figures, wherein elements that are the same or have the same effect are mostly provided with the same reference symbols. In the figures:

FIG. 1 shows a dispensing device according to the disclosure with a sample carrier with multiple containers, FIGS. 2a-2e show a side view of a container to explain the individual steps of the calibration operation, FIG. 3 shows a flow chart of a calibration operation and FIG. 4 shows a flow chart of a dispensing operation.

DETAILED DESCRIPTION

A dispensing device 1 shown in FIG. 1 has a dispenser 4 for dispensing a liquid sample 5 into a container 3. In addition, the dispensing device 1 has a detection device 6 for scanning a partial volume region 7 of the container 3 in order to detect a particle 8 located in the liquid sample. The dispensed liquid sample 5 may contain no particle 8, a single particle, or multiple particles. Accordingly, after the liquid sample 5 has been dispensed, the detection device 6 will detect zero particles, a single particle, or multiple particles in the partial volume region 7.

The container 3 is at least partially filled with a liquid 2. The dispensing device 1 also has a control device 11 which is electrically connected to the dispenser 4 and the detection device 6. The electrical connection is shown with dashed lines in FIG. 1.

FIG. 1 shows a state at a point in time after a dispensing process has taken place. The dispensed liquid sample 5, which contains a particle 8, has already fallen into the liquid in the container 3. It can be seen from FIG. 1 that the particle 8 is located in the partial volume region 7.

The detection device 6 has an imaging apparatus, by means of which a large number of images are recorded in the partial volume region 7. As a result, the images depict the partial volume region 7. Since the particle 8 is arranged in the partial volume region 7, the particle 8 can be detected. FIG. 1 shows the image planes in the partial volume region 7, in each of which an image is recorded. The image planes are arranged offset from one another along a spatial direction Z. The spatial direction Z is perpendicular to the container bottom 12. The lower limit 10 of the partial volume region is arranged closer to the container bottom 12 than the upper limit 9 of the partial volume region 7. The partial volume region 7 is arranged offset along the spatial direction Z with respect to the container bottom 12.

A sample carrier 15, which is a microtiter plate, for example, has multiple containers 3. The dispenser 4 and the sample carrier 15 are each placed in relation to one another in such a way that the dispenser 4 dispenses a liquid sample 5 into the container 3.

The detection device 6 determines the upper limit 9 and the lower limit 10 of the partial volume region 7 in a calibration operation upstream of (i.e., prior to) the dispensing operation. The calibration operation can be carried out with one container 3 or with several containers 3 of the sample carrier 15. The calibration operation is explained using FIGS. 2a to 2e and the flow chart shown in FIG. 3.

The calibration operation is initiated in a first step S1. The introduction takes place after a sample carrier 15 containing several containers has been inserted into the dispensing device 1. In particular, the calibration operation can be carried out in a first dispensing process into a container 3 of the sample carrier 15. The subsequent dispensing processes can then be carried out in accordance with the flowchart shown in FIG. 3.

After initiating the calibration operation in the first step S1, the container bottom 12 and a liquid surface 16 of the liquid 2 in the container 3 are determined in a second step S2. The container bottom 12 can take place by means of an autofocus of the detection device 6. The liquid surface 16 can be determined based on the input from the user of the dispensing device 1 regarding the amount of liquid introduced into the container. In addition, the user can enter a container cross-sectional area, which is also used to determine the liquid surface 16. Alternatively, the container cross-sectional area can be determined automatically. The determination can be made in the evaluation device of the detection device 6. This process is shown in FIG. 2a.

A container volume 13 can then be scanned in a third step S3. The container volume 13 comprises the entire liquid volume. In addition, the container volume 13 also includes a part that does not contain liquid. An upper limit 17 of the container volume 13 is arranged offset by a predetermined distance from the liquid surface 16 along the spatial direction Z. This state is shown in FIG. 2b. As a result, after the third step S3, there are a large number of background images which show the container without a particle 8.

Steps S2 and S3 are optional and only serve to determine the position of particle 8 precisely. In other words, the method also works if only steps S4 to S8, which are described in more detail below, are carried out.

In a fourth step S4, which is shown in FIG. 2c, a liquid sample 5 is dispensed from the dispenser 4. The liquid sample 5 shown has a particle 8. The liquid sample 5 drops into the liquid 2 in the container 2.

In a fifth step S5, the detection device 6 scans the container volume 13. The container volume 13 preferably has the same volume as the container volume 13 scanned in the third step S3. Alternatively, the container volume 13 can comprise a larger volume. Thus, the container volume 13 can additionally comprise a section that is arranged below the container bottom 12. The detection process is carried out in such a way that the recorded images can be assigned to the previously generated background images. In particular, the position of the individual image planes corresponds to the position of the associated background images.

Then, in a sixth step S6, the detection device 6 determines the position of the particle 8 in the container 3. In particular, the position of the particle 8 in the spatial direction Z is detected. The distance of the particle 8 from the container bottom 12 along the spatial direction Z can be detected. This state is shown in FIG. 2d. In order to detect the position of the particle 8 in the container 3, the images captured in the fifth step S5 can be compared with the images captured in the third step S3.

In a seventh step S7, the detection device 6 defines the upper limit 9 and the lower limit 10 on the basis of the determined position of the particle 8. In particular, the detection device determines that the upper limit 9 is arranged offset by a first distance d1 along the spatial direction Z from the particle 8. The lower limit 10 is arranged offset along a spatial direction Z by a second distance d2 from the particle 8. This state is shown in FIG. 2e.

Thus, after the seventh step S7, the partial volume region 7 is fixed. This partial volume region 7 is scanned in at least some of the dispensing operations of a dispensing operation which follow the calibration operation in time. As already described above, a liquid sample 5 is dispensed in the dispensing operation for the controlled isolation of a specific number of particles.

FIG. 4 shows a flow chart of the dispensing device 1 in a dispensing operation, the partial volume region 7 having already been determined in a calibration method. In a first step V1 the control device 11 causes a liquid sample 5 to be dispensed through the dispenser 4. The control device 11 notifies the detection device 6 of the dispensing process. In a second step V2, the detection device 6 can start scanning the partial volume region 7 immediately after receiving the information from the control device 11 or after a predetermined time.

In a third step V3, the detection device 6 detects the number of particles 8 determined in the partial volume region 7. In a fourth step V4, it is checked whether the number of particles 8 located in the partial volume region corresponds to a predetermined number. If this is the case, the position of the particle or particles is determined in a fifth step V5.

In a sixth step V6, a check is made as to whether the position of the particle 8 corresponds to the positions of particles 8 that were determined in previous dispensing processes, or whether it is within a predetermined range. If this is the case, the partial volume region 7 is reduced in the seventh step V7 and the detection process is ended. The reduced partial volume region 7 is used in subsequent dispensing processes. This means that the detection device 6 scans the reduced partial volume region 7 during subsequent dispensing processes.

If it is determined in the sixth step V6 that the position of the particle does not match the position of particles from previous dispensing processes, the detection process is ended in an eighth step V8. In subsequent dispensing processes, the same partial volume region 7 is used as in the second step V2. In both the seventh and eighth step, after the detection process has ended, the dispenser 4 and/or sample carrier 15 is moved in such a way that dispensing into another container 3 is possible.

In the event that it is determined in the fourth step V4 that the number of particles in the partial volume region 7 does not correspond to the specified number of particles, the ninth step V9 checks whether there are more than the specified number of particles 8 in the partial volume region 7 is arranged. If this is the case, the detection process is ended in step V10.

If it is detected in the ninth step V9 that no particle is arranged in the partial volume region 7, the partial volume region 7 is enlarged in the eleventh step V11 and the scanning process is repeated. In this case, the detection device 6 scans the enlarged partial volume region 7 according to step V2 and steps V3 to V9 are repeated.

LIST OF REFERENCE SIGNS

1. Dispensing device
2. Liquid
3. Container
4. Dispenser
5. Liquid sample
6. Detection device
7. Partial volume region
8. Particle
9. Upper limit
10. Lower limit
11. Control device
12. Container bottom
13. container volume
14. Sample carrier
15. Liquid surface
16. Upper limit of the container volume
A Distance
Z Spatial direction
d1 First spacing
d2 Second spacing
S1-S8 Method steps in the calibration operation
V1-V11 Method steps in dispensing mode

What is claimed is:

1. A method for detecting a particle (8) in a container (3) containing liquid (2), the method comprising the following steps:
    performing a calibration operation comprising the steps of dispensing a calibration liquid sample (5) having a calibration particle (8) into the container (3), determining a height of the calibration particle (8) above a container bottom (12) of the container (3), and determining an upper limit (9) and a lower limit (10) of a partial volume region (7) of the container (3) based on the determined height of the calibration particle (8);
    dispensing a detection liquid sample (5) into the container (3) in a dispensing operation after performing the calibration operation;
    scanning the partial volume region (7) of the container (3) defined by the upper limit (9) and the lower limit (10) determined in the calibration operation to detect a particle (8) located in the liquid sample (5).

2. The method according to claim 1, wherein at least one of a liquid surface (16), a cross-sectional area of the container (3), and a container bottom (12) is determined in the calibration operation.

3. The method according to claim 1, wherein a container volume (13) of the container (3) is scanned in the calibration operation and a plurality of background images of the container volume (13) are recorded.

4. The method according to claim 3, wherein the calibration operation is carried out when a sample carrier (15) having multiple containers including the container (3) is inserted into a dispensing device (1), and in the calibration operation, the calibration liquid sample (5) having the calibration particle (8) is dispensed into the container (3) of the sample carrier (15).

5. The method according to claim 4, wherein the container volume (13) is scanned after the calibration liquid sample (5) has been dispensed and a plurality of images of the container volume (13) are recorded.

6. The method according to claim 3, wherein the container volume (13) has a volume from a container bottom (12) to a liquid surface (16) or to an upper boundary (17) offset from the liquid surface (16) by a predetermined distance.

7. The method according to claim 5, wherein the calibration particle (8) is detected using the recorded images and the recorded background images.

8. The method according to claim 1, wherein, in the calibration operation, the upper limit (9) is determined as being offset by a predetermined first distance (d1) from the height of the calibration particle and the lower limit (10) is determined as being offset by a predetermined second distance (d2) from the height of the calibration particle (8).

9. The method according to claim 1, wherein a height of the particle (8) above the container bottom (12) of the container (3) is determined in the dispensing operation.

10. The method according to claim 9, wherein the height of the particle (8) is determined after the step of dispensing a liquid sample (5) into the container (3) is performed a predetermined number of times or the height of the particle (8) is determined each time the step of dispensing a liquid sample (5) into the container (3) is performed.

11. The method according to claim 9, wherein presence of the particle (8) in the partial volume region (7) is determined.

12. The method according to claim 11, wherein the calibration operation is initiated again when the particle (8) is not present in the partial volume region (7) or the partial volume region (7) to be scanned is enlarged when the particle (8) is not present in the partial volume region (7).

13. The method according to claim 1, further comprising determining the number of particles (8) present in the partial volume region (7).

14. The method according to claim 1, wherein a different liquid sample (5) is respectively dispensed into a respective one of multiple containers (3), a position of a particle (8) in the respective container (3) is determined, and the partial volume region (7) is reduced if the particles (8) in the respective containers (3) all have a same position or a position in a predetermined range.

* * * * *